Patented June 29, 1943

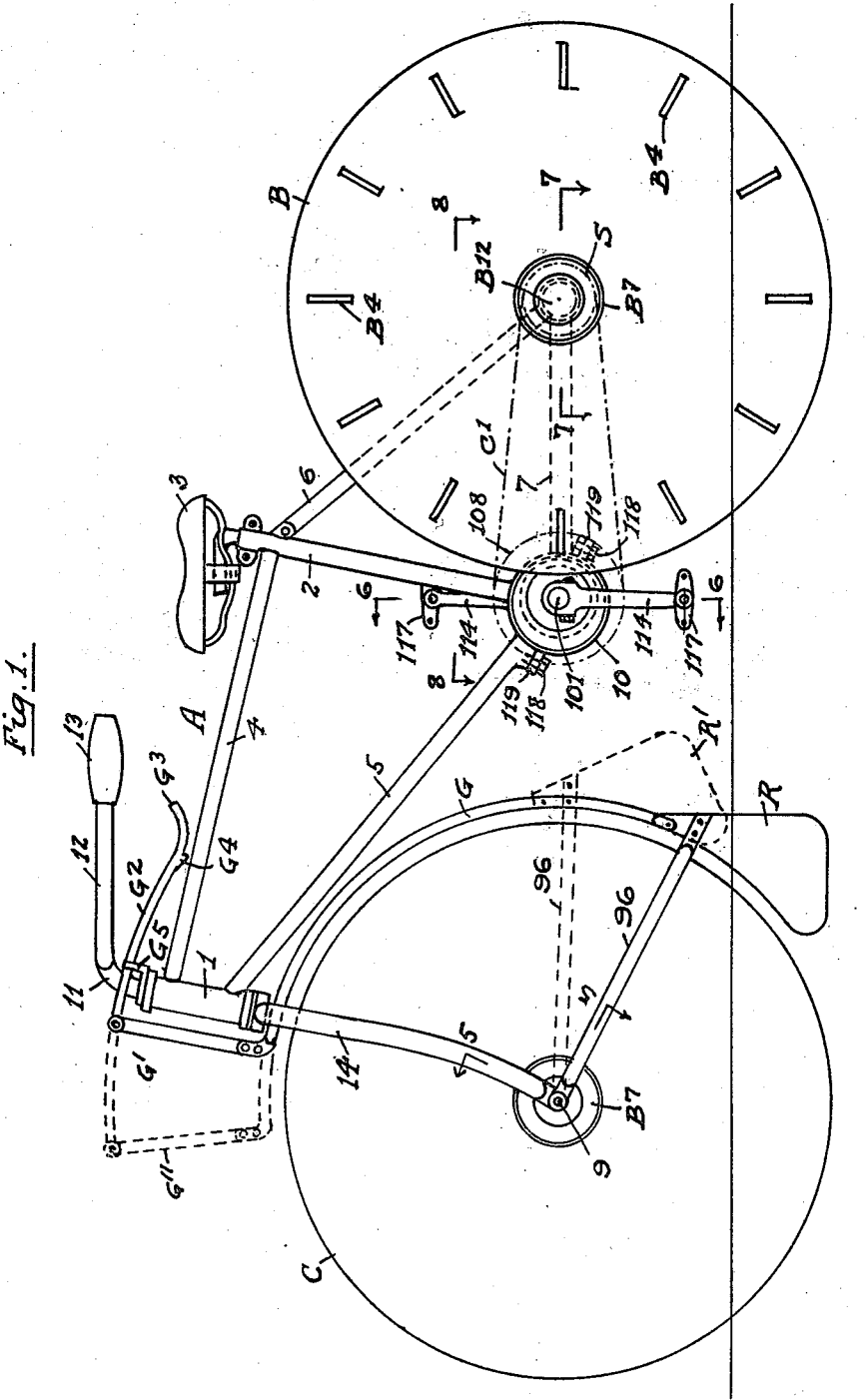

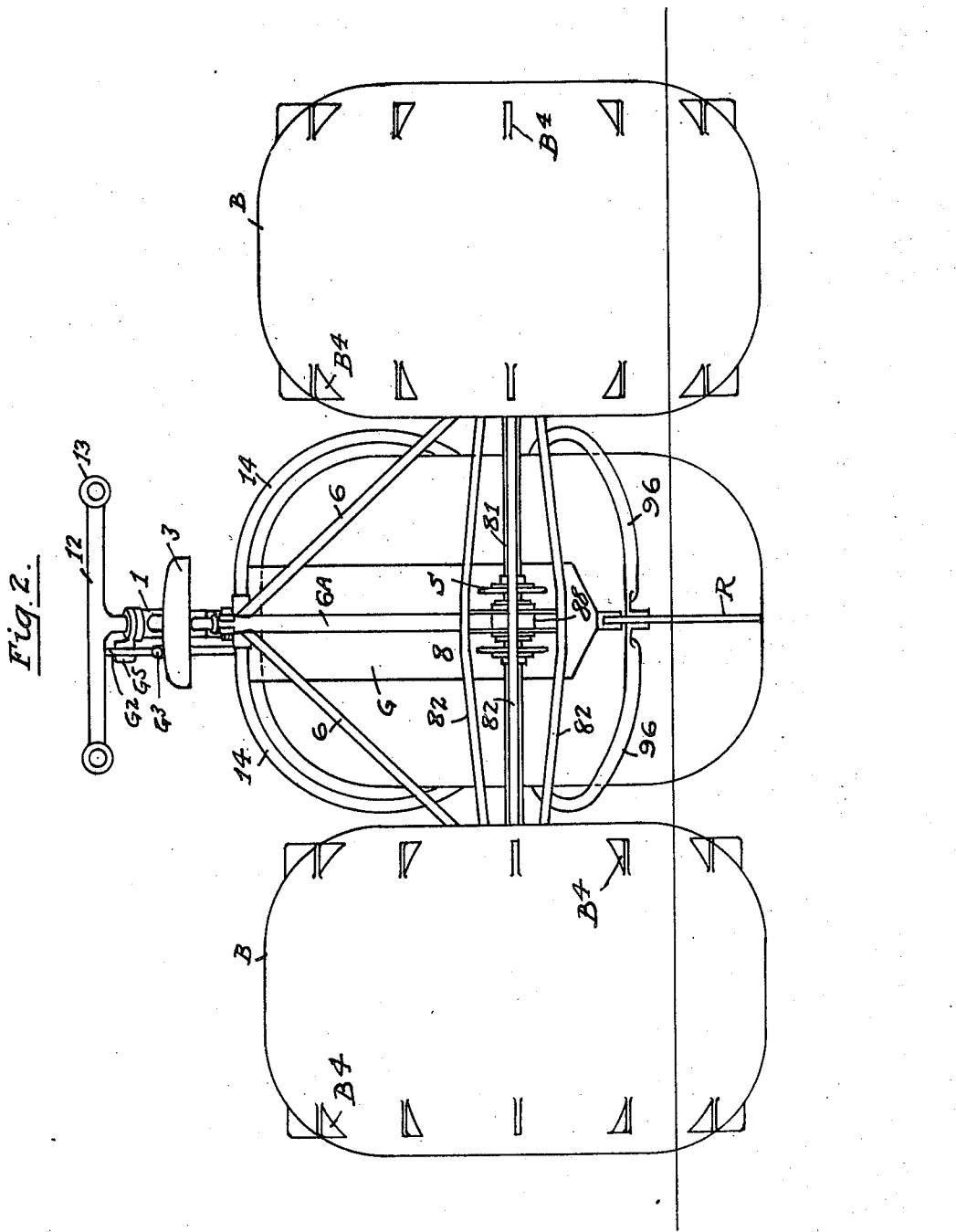

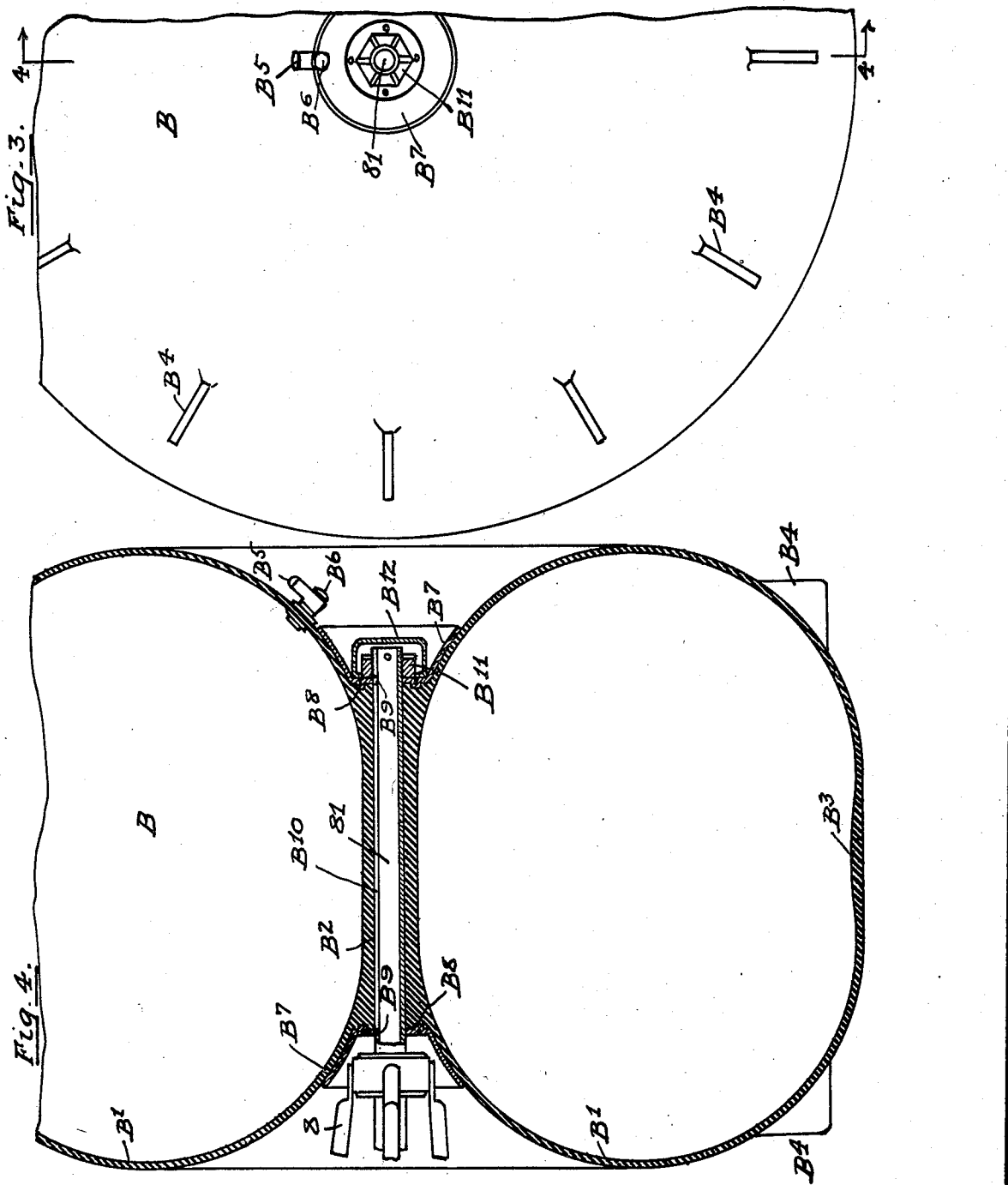

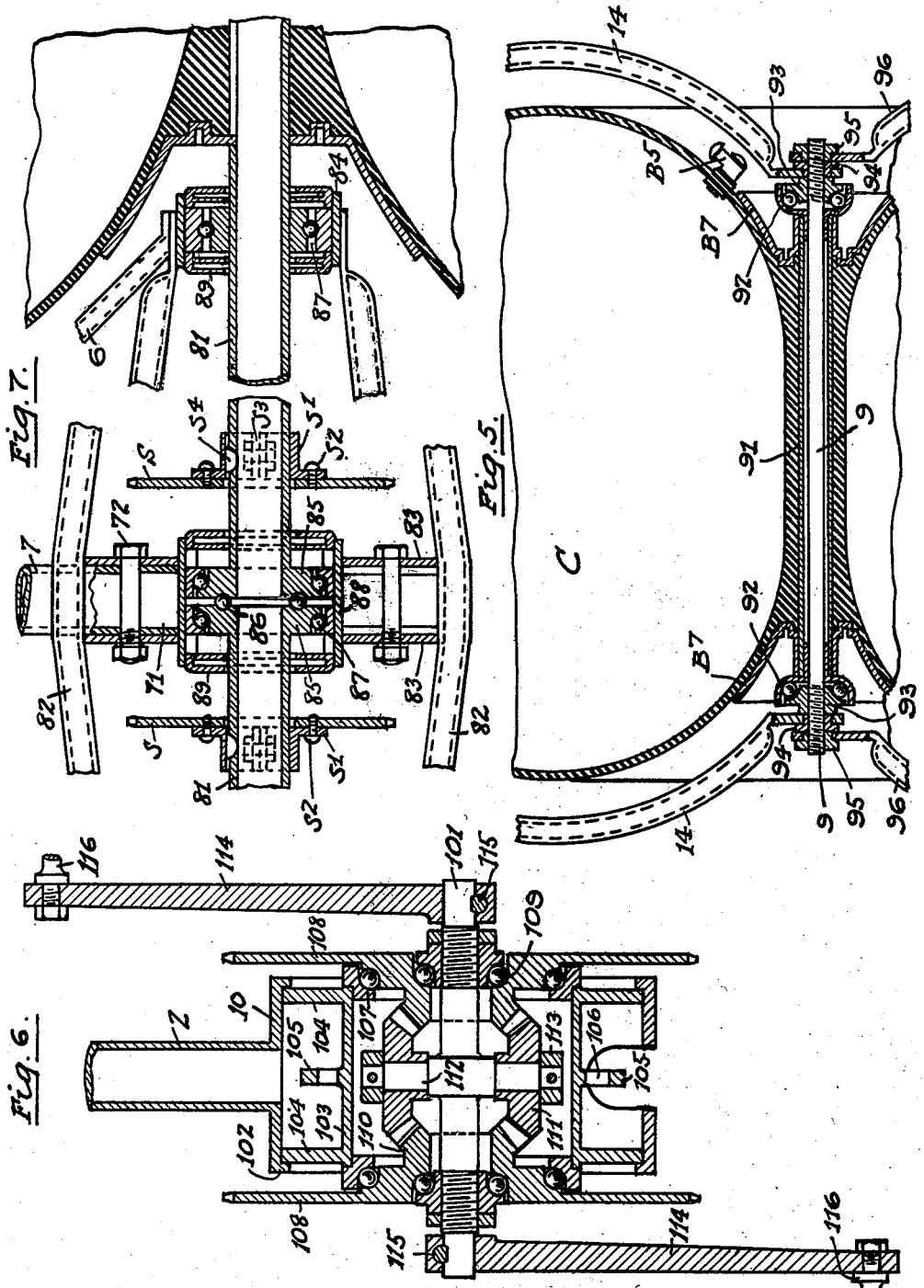

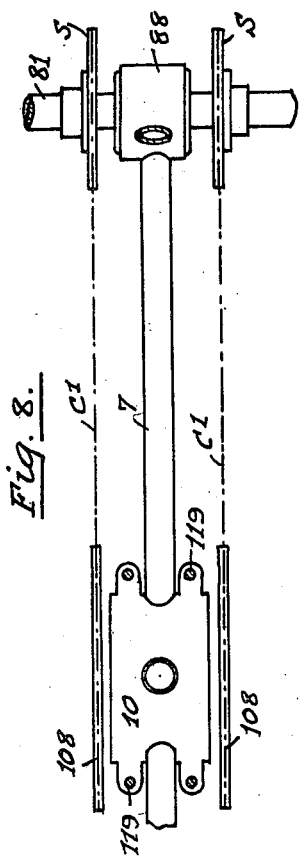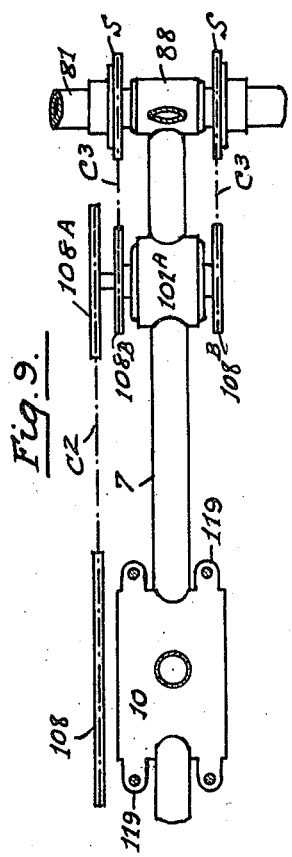

2,323,261

UNITED STATES PATENT OFFICE 2,323,261

WATER CYCLE

David Vigo, Ann Arbor, Mich.

Substituted for abandoned application Serial No. 361,289, October 15, 1940. This application March 22, 1943, Serial No. 480,119

3 Claims. (Cl. 115—27)

This case is a substitute for application No. 361,289, filed Oct. 15, 1940, by David Vigo.

My invention relates to water cycles, and its principal object is to provide a wheeled vehicle by which one or more persons may travel upon the surface of a lake, river or other relatively smooth body of water.

Another object of my said invention is to provide a vehicle of the character referred to which is capable of travelling at a limited speed on land, so that it may be conveniently transferred from one body of water to another and at the same time may be stored in a garage or other building, thereby avoiding the great expense of a dock or other place of floating storage.

A further object of my said invention is to provide a vehicle of the character recited which is relatively light in weight and simple in construction so that it may be manufactured very economically by modern methods of production, and may thus be sold at prices within the reach of those of moderate means.

It is contemplated that due to this latter feature my improved vehicle may become universally adopted, providing healthful exercise and enjoyable sport in the same manner as is the present case with the ordinary bicycle.

With these and other objects in view, I will now describe a preferred embodiment of my invention, reference being had to the accompanying drawings, in which—

Figure 1 is a side elevation of a three-wheeled vehicle constructed in accordance with my invention.

Figure 2 is a rear view of the same.

Figure 3 is a fragmentary elevation showing the construction of one of the driving or propelling floats or wheels.

Figure 4 is a fragmentary vertical section of the same taken on line 4—4 of Figure 3.

Figure 5 is a fragmentary transverse section illustrating the construction of the steering float or wheel, showing details of the axle and the method of attaching the steering fork and other parts, the section being taken approximately on line 5—5 of Figure 1.

Figure 6 is a vertical section taken on line 6—6 of Figure 1 showing the construction of the driving axle with its accompanying differential gear.

Figure 7 is a fragmentary horizontal section taken on line 7—7 of Figure 1 showing the details of the rear or driven axle.

Figure 8 is a fragmentary plan view looking in the direction of line 8—8 of Figure 1, showing diagrammatically the arrangement of the power transmission gearing as employing in the instant vehicle, and Figure 9 is a similar plan view showing an alternative arrangement of the power transmission gearing in which is included a special form of the well-known coaster brake.

Like characters designate corresponding parts throughout the several views.

My improved vehicle consists essentially of a frame A, a pair of rear driving wheels B, and a front or steering wheel C, the latter being swivelly mounted and being provided with steering means similar to the conventional bicycle type.

The frame A, preferably of welded tubular construction, comprises a front steering socket 1; a seat-supporting member 2 having at its upper end an adjustable seat or saddle 3 and connected by upper and lower longitudinal braces 4, 5 to the steering socket; a pair of rear upper braces 6 arranged in bifurcated form; between which is located a single detachable brace 6A and a lower rear brace 7. The upper and lower braces 6, 6A, 7 are connected to a trussed rear axle support 8, carrying the driven axle 8I. In ball bearings within the socket 1 is mounted a steering post 11 having at its upper end a pair of horizontal members 12 carrying the handles 13, and at its lower end a pair of forked members 14 in the lower ends of which is mounted the front axle 9. At the junction of the frame members 2, 5 and 7 is a special form of crank hanger 10 in which is mounted a driving axle 10I.

The propelling wheels or floats B, shown in detail in Figures 3 and 4, consist of an exaggerated form of pneumatic tire casing B' of rubber or other suitable material and having a relatively small bore B2 adapted to be secured to the driven axle, and reinforced along the center line of the tread as indicated at B3. The dimensions of these wheels or floats are so calculated as to provide sufficient displacement in the water to sustain the vehicle as a whole under proper conditions of stability, and near the outer periphery are a series of lugs B4 adapted to impinge upon the water and provide the necessary traction. An air valve B5 is provided for the inflation of the wheel and this valve is preferably provided with a blow-off or relief valve B6 of any convenient form. The front or steering wheel C is of similar construction to that just described with the exception that the lugs B4 are omitted. The bore of the wheels B in the example shown is of proper diameter to slidably receive the driven axle 8I, and in order to secure it in position thereupon there are provided a pair of frusto-conical washers B7 having their outer peripheries curved to fit the outer surface of the wheel and having upon their inner faces a series of projections B8 which fit in recesses in the material of the wheel. The inner of the flanges B7 is provided with one or more integral keys or projections B9 adapted to engage a slot or slots B10 in the axle, so as to provide a proper driving relation between the members. The projections B9 also serve to locate the wheels along the axle upon which they are further secured as by the lock nut B11, the latter being covered by a hub cap B12 held in position by any convenient well-known means. Bore B2 of the wheels may be greater than the axle. The washers B7 having cylindrical spacer members to fit said bore.

Intermediate the propelling wheels or floats is the before-mentioned axle support 8, as shown in Figures 2 and 7, which consists of four bow-shaped tubular members 82 arranged at intervals of ninety degrees around its axis and connected together at their middle by means of annular plates 83 and at their ends by cylindrical members 84, the whole being welded together so as to form a complete unit. Between the members 83 is interposed the squared end 71 of the member 7 and a similar end of the member 6A which are secured in position as by the bolts 72, and to the members 84 are secured the members 6, preferably by welding.

The axle 81 is in two parts divided at the center, the two parts being provided with flanges 85 having their inner faces grooved to accommodate thrust bearing balls 86, while their outer peripheries are supported in ball bearings 87 mounted in the cylindrical member 88, the latter member being carried in a central bore in the plates 83. Enclosures 89 are provided upon the member 88. The members 84 upon the outer ends of the truss carry the ball bearings 87' slidable upon the axle by well-known means and provided with closures 89. The two sections of the axle are each provided with a sprocket S connected to flanges S' as by screws S2. The flanges S' are divided, as indicated in broken lines at S3, and have keyways to receive the "Woodruff" keys S4.

As shown in detail in Figures 1 and 6 of the drawings, the crank hanger 10 is in the form of a hollow cylinder connected by welding to the supporting members of the frame and having on its edges the inwardly projecting flanges 102 between which is positioned a member 103 provided with excentrically disposed flanges 104 rotatably mounted in the hanger 10 and also a central annular flange 105 having therein a series of openings 106 for a purpose to be hereinafter explained. In ball bearings 107 in the member 103 are mounted a pair of sprockets 108, and within these sprockets are ball bearings 109 which serve to support the driving shaft 101.

Thus it will be seen by reference to Figure 6 of the drawings that the sprockets are independently and rotatably held within the excentric member 103, and upon the inner faces of these sprockets are integral bevelled gears 110 which are connected together by the centrally disposed gears 111 carried upon transverse studs 112 formed upon the driving shaft 101 and held in position as by the collars 113, this arrangement forming a differential gearing of the type well-known in the art. The cranks 114 are secured upon the axle 101 as by the cotters 115 and carry at their outer ends axles 116 upon which are mounted the pedals 117 in the usual manner.

The front or driving sprockets 108 and the rear or driven sprockets S are connected by conventional pitch chains C', and in the initial assembly the member 103, in which the driving axle is carried, is positioned as shown in the drawing Figure 1 in which the centers of the driving and driven axles are at a minimum. Then, as the chains stretch, due to wear, the member 103 is rotated by inserting some form of wrench or other tool in the openings 106 in its central flange. This rotation, due to the excentric form of the flanges 104, will cause the distance between the said centers to be increased so as to tighten the chain. In order to hold the parts firmly in position, the crank hanger 10 is split diametrically, and the two parts are clamped together by the bolts 118 as shown in Figure 1, passing through lugs 119.

The steering wheel or float C, shown in detail in the fragmentary section, Figure 5, has a central bore adapted to receive the tubular member 91 which is retained in position by means of frusto-conical washers B7 similar to those previously described with reference to the rear wheels. In the ends of the member 91 are pressed the ball bearing cups 92 which receive co-acting cones 93 secured upon the axle 9, and externally of these cones are secured the flattened ends of the steering forks 14, there being a bushing 94 interposed between the forks and the axle. Upon the extreme ends of the axle 9 are a pair of collars 95 which have a reduced portion adapted to receive the flattened ends of a pair of curved members 96 similar in construction to the members 14. Between the free ends of the members 96 is secured a rudder R formed from metal plate, and to the upper end of this rudder is secured a relatively wide splash guard G designed to protect the rider from water thrown out by centrifugal force from the front wheel. The upper end of the splash guard is slidably supported, by any suitable means, upon the lower extremity of the steering post 11, that is to say, between the forked members 14, and the said guard is provided at its upper end with a detachable vertical lever G' to which is pivoted a rod G2 terminating in a handle G3 by which the guard G may be moved around the axle 9 as a center so as to raise the rudder to the position indicated at R' in Figure 1 in which it becomes inoperative. The lever G' then occupies the position indicated at G'' and is held therein due to the projecting lug G4 upon the handle which engages a forked bracket G5 secured to the steering post 11. Thus, while the wheel C together with its rudder R is swivelled within the socket 1 to effect steering, the rudder may be raised and lowered as occasion requires.

The diagram, Figure 8, shows the general plan of the transmission as hereinbefore described and as shown in the drawings. In some cases, however, it may be desirable to incorporate in the transmission gear some form of coaster brake, and in such case, as shown diagrammatically in Figure 9, there is provided intermediate the crank hanger 10 and the rear axle 81 a cylindrical member 101A which serves to contain a differential gear of the type previously shown within the hanger 10, but in this case the differential is combined with any suitable form of coaster brake mechanism in which the brake is applied by a backward movement of the pedals. In this arrangement, therefore, the sprocket 108 is connected by a chain C2 to a sprocket 108A, and the power from the mechanism within the member 101A is carried to the two halves of the rear axle by means of a pair of chains C3 which connect the sprockets 108B to the rear sprockets S. The construction of coaster brakes and differential mechanisms is so well known in the art that no further description or illustration of this modification is deemed necessary.

It will be observed from the foregoing description and by reference to the drawings that I have provided a vehicle which is simple in construction and relatively cheap to manufacture, and while I have herein described and shown a preferred embodiment of my said invention, it will be readily understood by those skilled in the art to which the same pertains that various changes in detail may be made to suit any particular or peculiar requirements without departing from the spirit of my invention as defined in the appended claims. For example, while I have herein shown and described my improved vehicle as having three wheels, and being capable of carrying a single rider, obviously the same may be made to carry two or more persons and may further be provided with four wheels in order to obtain increased stability. In the four-wheeled form, the two front wheels will be provided with a steering gear of the well-known "Ackerman" type now universally used in automobile construction. Further, I may employ two rudders in place of the single rudder shown in order to obtain some steering power. It will be understood, also, that my improved vehicle is susceptible of being propelled by any form of motive power such as by gasoline or electric motor, the standard parts for which are already available on the market.

Having thus described my said invention, what I claim and desire to secure by Letters Patent of the United States is:

1. A vehicle of the character described comprising a frame having a seat, a hollow member extending laterally from said frame at one end thereof, an axle rotatable within said member, a pair of circular floats mounted on the ends of said axle, means for rotating said axle, a steering socket on the other end of said frame, a steering fork rotatably mounted within said socket and having thereupon handles spaced apart, a circular float rotatably mounted within said fork, a rudder swingably mounted upon said fork, and means for holding said rudder in raised position.

2. A vehicle of the character described comprising a frame having a seat, a hollow member extending laterally from said frame at one end thereof, an axle rotatable within said member and formed in two parts, a driving shaft including a differential gearing, a pair of chain sprockets arranged in spaced relation and driven through said gearing, a pair of sprockets mounted upon the half axles and connected by chains with said first-mentioned sprockets, and a pair of circular floats mounted on the outer ends of said half axles.

3. A vehicle of the character described comprising a frame having a seat, a hollow member extending laterally from said frame at one end thereof, an axle rotatable within said member and formed in two parts, a pedal-driven shaft including a differential gearing, a pair of chain sprockets arranged in spaced relation and driven through said gearing, a pair of sprockets mounted upon the half axles and connected by chains with said first-mentioned sprockets, a pair of circular floats mounted on the outer ends of said half axles, and a brake mechanism operated by backward movement of said pedal-driven shaft.

DAVID VIGO.